UNITED STATES PATENT OFFICE.

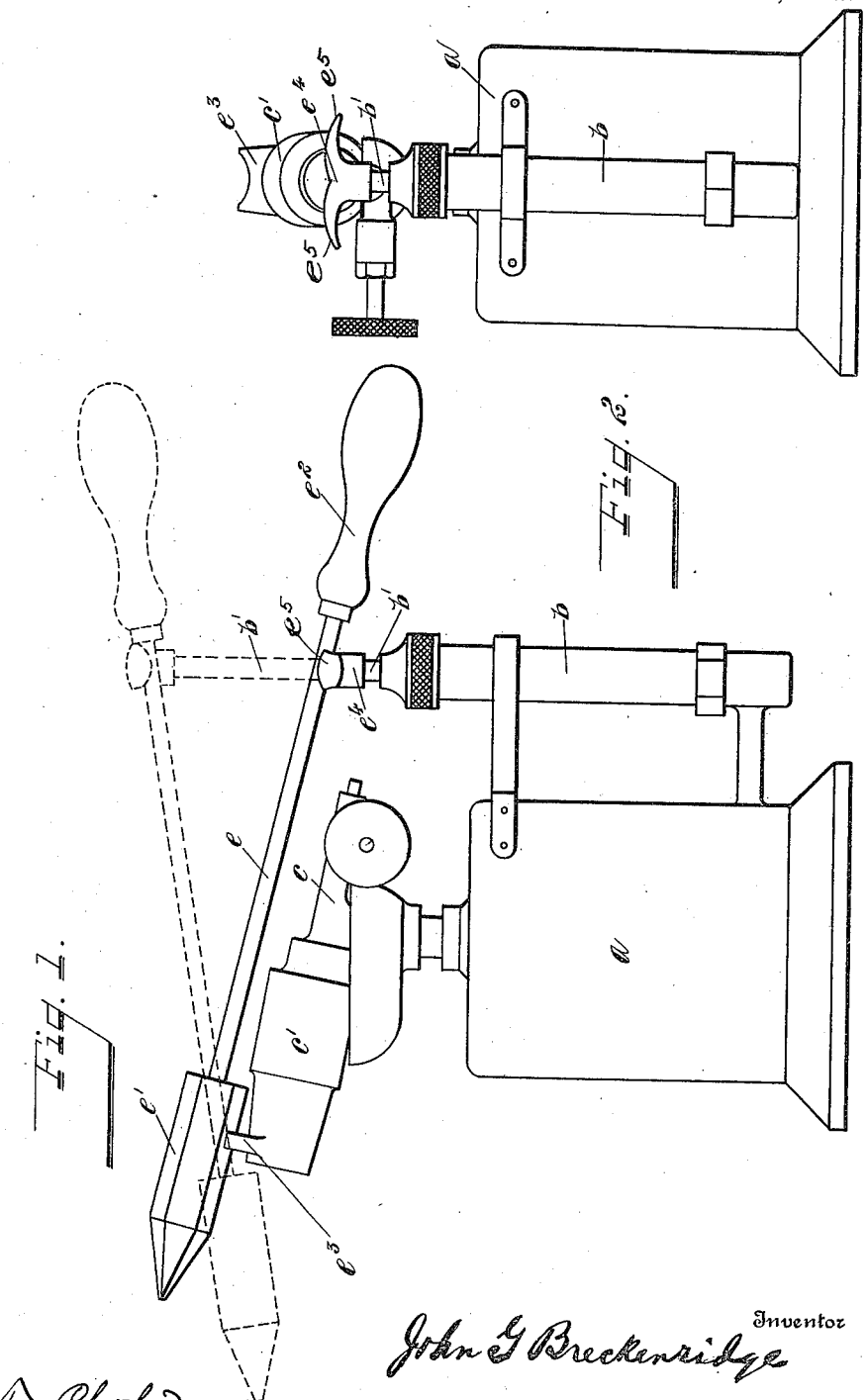

JOHN G. BRECKENRIDGE, OF SPRINGFIELD, OHIO, ASSIGNOR TO THE RIDGELY TRIMMER COMPANY, OF SPRINGFIELD, OHIO, A CORPORATION OF OHIO.

BLOW-TORCH.

1,013,637.  Specification of Letters Patent.  Patented Jan. 2, 1912.

Application filed December 10, 1909. Serial No. 532,488.

*To all whom it may concern:*

Be it known that I, JOHN G. BRECKENRIDGE, a citizen of the United States, residing at Springfield, in the county of Clark and State of Ohio, have invented certain new and useful Improvements in Blow-Torches, of which the following is a specification.

This invention relates to improvements in blow torches of the kind which are especially adapted for the use of plumbers, although the improvements are applicable to blow torches of other types.

The object of the invention is to provide means for supporting a soldering iron such that the iron may be supported in any position of adjustment with respect to the flame.

This invention consists in the constructions and combinations of parts hereinafter described and set forth in the claims.

In the accompanying drawings; Figure 1 is a side elevation of the device involving my improvements. Fig. 2 is an end elevation of the same.

Like parts are represented by similar characters of reference in the several views.

In the said drawings, $a$ represents the outer casing of the torch constructed in the ordinary way to contain a supply of gasolene.

$b$ is an air pump of ordinary construction adapted to spray the gasolene to the burner. $c$ is the burner, which has secured thereto the usual forwardly projecting burner tube or flame nozzle $c^1$.

In order to provide for supporting a soldering iron in any position of adjustment with respect to the flame I have utilized the handle of the air pump to support one end of this iron. The iron is represented by $e$, which has at one end the usual enlarged copper head $e^1$ and at the other end the handle $e^2$.

$e^3$ represents the usual support for the iron located at the forward end of the flame nozzle $c^1$ adapted to receive and support the forward part of the iron. The upper portion of the handle for the pump is formed with a support $e^4$, preferably concaved at its center, as shown, adapted to form a rear support for the iron, and having laterally projecting arms $e^5$, each of which is concaved on its under side so as to adapt it to receive the rear end of the soldering iron in one of its supported positions, as indicated in dotted lines in Fig. 1. These arms $e^5$ are also adapted to form finger holds for the operator in manipulating the piston. The friction of the piston $b^1$ in the cylinder $b$ of the pump is such that it will support the rear end of the iron $e$ in any position between the limits of the down and up stroke of the piston. Thus, if desired, the iron may be supported in the position shown in full lines in Fig. 1 with the piston at the limit of its down stroke, in which position the head $e^1$ of the iron will be above or parallel with the direction of the flame, or it may be supported in the position shown in dotted lines in Fig. 1, with the piston $b^1$ at the limit of its upper stroke, in which position the head $e^1$ will be directly within the flame; or it may be supported at any point between these two positions.

Having thus described my invention, I claim:

1. In a torch such as described, a forward support for a soldering iron, an air pump, and a piston in said air pump, said piston being so positioned with respect to said support that the upper end of said piston also forms a support for said soldering iron to hold the same in different positions of adjustment.

2. In a torch such as described, a burner, a support for a soldering iron located on the forward part of said burner, an air pump located at the rear of said burner, a piston in said pump having a support for said iron at its upper end, said piston support being so positioned with respect to said burner support that it is adapted to form a rest for the rear end of said soldering iron to hold the same in different positions of adjustment.

3. In a torch such as described, a burner, a rest or support for a soldering iron located on the forward part of said burner, and an air pump comprising a piston located at the rear of said burner, said piston having a rest or support for the soldering iron, said rest or support comprising a projecting part adapted to receive the soldering iron on the underside thereof in one position of said iron, substantially as and for the purpose specified.

In testimony whereof, I have hereunto set my hand this 18th day of November 1909.

JOHN G. BRECKENRIDGE.

Witnesses:
CHAS. I. WELCH,
EFFA M. SMITH.

Copies of this patent may be obtained for five cents each, by addressing the "Commissioner of Patents, Washington, D. C."